United States Patent [19]

Kawaguchi

[11] Patent Number: 5,414,800
[45] Date of Patent: May 9, 1995

[54] IMAGE DATA PROCESSING APPARATUS IN WHICH THE STATE OF MOUNTING IN DELAY MEMORY IS DETECTED

[75] Inventor: Toshikazu Kawaguchi, Toyokawa, Japan

[73] Assignee: Minolta Camera Kabushiki Kaisha, Osaka, Japan

[21] Appl. No.: 212,392

[22] Filed: Mar. 10, 1994

Related U.S. Application Data

[63] Continuation of Ser. No. 881,138, May 11, 1992.

[30] Foreign Application Priority Data

May 10, 1991 [JP] Japan .................... 3-135914

[51] Int. Cl.⁶ .................................. G06F 15/00
[52] U.S. Cl. ............................. 395/115; 395/109; 395/114
[58] Field of Search ............... 395/101, 114, 115, 116, 395/109, 112, 164–166, 425; 346/154, 157; 358/451, 426, 404, 444

[56] References Cited

U.S. PATENT DOCUMENTS

| | | | |
|---|---|---|---|
| 4,682,190 | 7/1987 | Ikeda | 346/154 |
| 4,884,147 | 11/1988 | Arimoto et al. | 358/451 |
| 4,943,910 | 4/1988 | Nakamura | 364/200 |
| 5,003,494 | 3/1991 | Ng | 346/157 |

FOREIGN PATENT DOCUMENTS 2-145367  6/1990  Japan .

Primary Examiner—Arthur G. Evans
Attorney, Agent, or Firm—Willian Brinks Hofer Gilson & Lione

[57] ABSTRACT

An apparatus for delaying image data of a plurality of parallel bits representing tones includes a compressing part for decreasing the number of bits of image data to decrease the number of tones, a delay memory for delaying image data provided from the compressing part, an extending part for increasing the number of bits of the image data provided from the delay memory to the original number of bits, and a memory mounting amount detecting part for detecting the state of mounting in the delay memory and designating the number of bits to be delayed by the delay memory for the compressing part and the extending part according to the detected state of mounting.

9 Claims, 3 Drawing Sheets

IMAGE DATA PROCESSING APPARATUS IN WHICH THE STATE OF MOUNTING IN DELAY MEMORY IS DETECTED

This application is a continuation of application Ser. No. 07/881,138, filed May 11, 1992.

BACKGROUND OF THE INVENTION

1. Field of the Invention

The present invention relates to image data processing apparatuses and, more particularly, to an image data processing apparatus for delaying image data having a plurality of parallel bits which represent tones.

2. Description of the Related Art

Conventionally, images in two colors are often formed simultaneously in a digital copying machine, a laser printer, or the like.

For example, in a copying machine, it is possible to set a simultaneous bicolor mode wherein an image of the original is scanned once to form an image of a particular part in the image of the original in red and an image of the other parts in black.

Such an image forming apparatus is constructed so that two chargers and two developing devices with different colors of toner are arranged respectively in positions facing an outer peripheral surface of a photoreceptor drum and shifted away from each other in a circumferential direction, and respective laser beams from two laser beam sources driven by different image data are irradiated to the photoreceptor drum in positions behind the respective chargers to perform exposure.

The positions on the photoreceptor drum exposed by the respective laser beam sources are shifted away from each other in the circumferential direction, so that it is necessary to delay image data to one of the laser beam sources which exposes a position backward in the direction of rotation of the photoreceptor drum by a time required for the photoreceptor drum to rotate therebetween as compared with image data to the other laser beam source, and an image data delaying apparatus is used for doing that.

A conventional image data delaying apparatus is constructed so that image data is once stored in a delay memory, and, after a lapse of a required time, the image data is read from the delay memory disclosed (Japanese Patent Laying-Open No. 2-145367 (1990), for example).

Although the capacity required for a delay memory is increased according to the number of bits of image data, i.e. the number of tones, the number of tones is conventionally determined fixedly during designing of the apparatus.

Specifically, the capacity of a delay memory is determined fixedly according to the number of tones in a conventional image data delaying apparatus. Therefore, it is not easy and is actually impossible to change the number of tones, especially to increase the capacity of the delay memory in order to increase the number of tones.

Therefore, in a case where it is desired to enhance the number of tones in a stage wherein a copying machine or a laser printer is used, large-scale remodeling, exchanging of printed board units all over the image data delaying apparatus, is required.

SUMMARY OF THE INVENTION

An object of the present invention is to make it easy to change the number of tones of image data having a plurality of bits which represent tones in an image data processing apparatus.

In order to achieve the above object, an image data processing apparatus according to the present invention includes compressing means for compressing image data having a plurality of bits which represent tones by decreasing the number of bits of the image data, memory means for storing the image data compressed by the compressing means, detecting means for detecting the storage capacity of the memory means, and setting means for setting the ratio of the decrease in the number of bits of the image data in the compressing means on the basis of the storage capacity of the memory means detected by the detecting means.

According to an image data processing apparatus constructed as described above, the ratio of decrease in the number of bits of image data is set on the basis of the storage capacity of the memory means, so that it is easy to change the number of tones of image data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
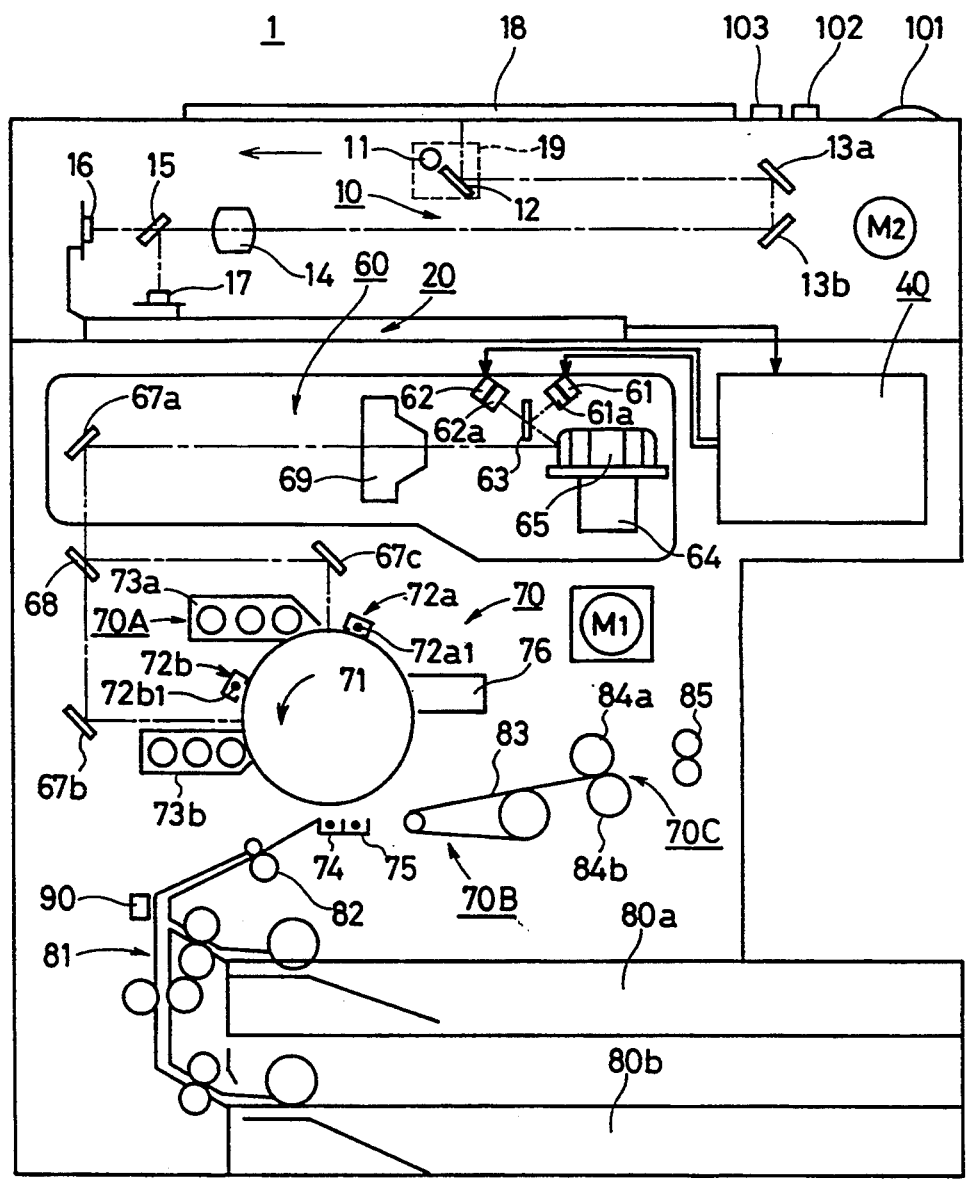
FIG. 3 is a sectional front view illustrating a mechanism of a copying machine capable of performing simultaneous bicolor copying using the print processing part in FIG. 1.

FIG. 3 is a sectional front view illustrating a structure of a copying machine 1 capable of performing simultaneous bicolor copying using a print processing part 40, which is an image data delaying apparatus according to an embodiment of the present invention.

Copying machine 1 includes a scanning system 10 for scanning an original, an image signal processing part 20 for processing an image signal transmitted from scanning system 10, a print processing part 40 for driving two semiconductor lasers 61, 62 on the basis of image data S1 provided from image signal processing part 20, an optical system 60 for irradiating two laser beams from semiconductor lasers 61, 62 to different positions on a photoreceptor drum 71 to perform exposure, and an image forming system 70 for developing a latent image formed by the exposure, transferring the image onto paper, which is a transfer body, and fixing it.

Scanning system 10 exposes and scans the original on a platen glass 18 and transfers reflected light therefrom into electric signals using photoelectric transfer elements 16, 17. Photoelectric transfer elements 16, 17 transfer an image of a specified color such as black, for example, and an image of the other colors (nonspecified colors) such as red into individual electric signals, respectively.

Scanning system 10 includes a scanner 19 on which an exposure lamp 11 and a mirror 12 are attached, fixed mirrors 13a, 13b, a lens 14, a half mirror 15, photoelectric transfer elements 16, 17 using CCD arrays or the like, a scan motor M2, and the like.

Image signal processing part 20 processes image signals provided from the two photoelectric transfer elements 16, 17, distinguishes between the specified color and the nonspecified colors, and provides them as image data S1 with color information to print processing part 40.

Print processing part 40 distributes the transmitted image data S1 with color information to the two semiconductor lasers 61, 62 to drive them and delays image data to be given to one semiconductor laser 62 in order to correct the difference between the positions on photoreceptor drum 71 exposed by the two semiconductor lasers. 61, 62 in the simultaneous bicolor mode.

Optical system 60 forms electrostatic latent images corresponding to images of red and black on photoreceptor drum 71 with laser beams from semiconductor lasers 61, 62.

Optical system 60 includes semiconductor lasers 61, 62, collimator lenses 61a, 62a, a combined mirror 63 formed of dichroic mirrors, a polygon mirror 65, a reflecting mirror 67a, a separation mirror 68 having characteristics similar to those of combined mirror 63, reflecting mirrors 67b, 67c, and so forth.

Image forming system 70 includes a developing and transfer system 70A, a transportation system 70B, and a fixing system 70C.

Developing and transfer system 70A includes photoreceptor drum 71, a first corona charger 72a of Scorotron type having a grid 72a1, a first developing device 73a, a second corona charger 72b having a grid 72b1, a second developing device 73b, a transfer charger 74, a copy paper separation charger 75, a cleaning part 76, and so forth.

A two-component developer including red toner and a carrier is accommodated in first developing device 73a, and a two-component developer including black toner and a carrier is accommodated in second developing device 73b.

transportation system 70B includes cassettes 80a, 80b which accommodate paper, a paper guide 81, a timing roller 82, a transport belt 83, and so forth. A paper sensor 90 for detecting the end of paper is provided on the course of paper guide 81.

Fixing system 70C includes heated fixing rollers 84a, 84b, a discharging roller 85, and so forth.

In addition, the top surface of copying machine 1 is provided with operating keys such as a print key 101 for starting a copying operation, a simultaneous bicolor selecting key 102 for selecting the simultaneous bicolor mode, a color selecting key 103 for selecting a monochromatic mode wherein black or red is selected in order to perform monochromatic copying, and a display device (not shown) using a LED for displaying a selection result.

Figure 1:
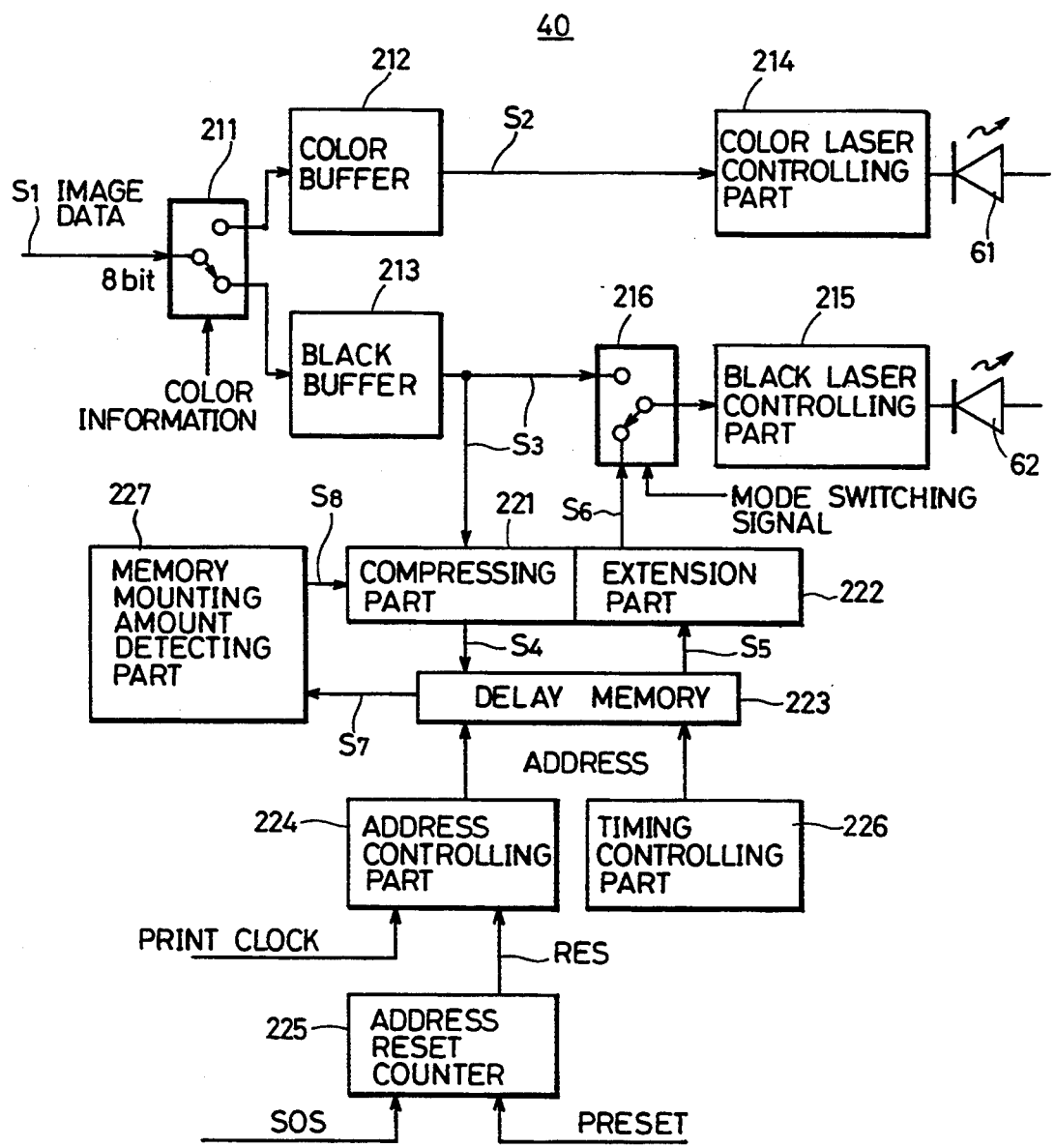
FIG. 1 is a block diagram illustrating a structure of a print processing part of a copying machine according to an embodiment of the present invention.

FIG. 1 is a block diagram illustrating a structure of print processing part 40 in FIG. 3.

Image data S1 of parallel eight bits provided from image signal processing part 20 is applied to a color separation part 211, which is switched according to color information from image signal processing part 20, and provided to either a color buffer 212 or a black buffer 213.

Color buffer 212 and black buffer 213 are used for synchronizing color or black image data S1 one line by one line and for adjusting the timing of starting main scanning.

A color laser controlling part 214 and a black laser controlling part 215 perform luminance modulation of semiconductor lasers 61, 62, respectively, according to applied image data S2, S3 or S6 to control the luminous intensity of them, respectively.

A data switching part 216 performs switching between image data S3 provided from black buffer 213 and image data S6 obtained by delaying it with a mode switching signal to provide the switched data to black laser controlling part 215. In the simultaneous bicolor mode, image data S6 is applied to black laser controlling part 215.

Compressing part 221 is for decreasing the number of bits (eight bits) of applied image data S3 or transferring it and provides image data S4 having bits of a number smaller or equal to the number of bits of image data S3.

A delay memory 223 is provided for delaying image data S4 of black by a time required for photoreceptor drum 71 to rotate between two positions exposed by semiconductor lasers 61, 62 in the simultaneous bicolor mode. As will be described below, each of memories constituting delay memory 223 is mounted on one printed board corresponding to each bit of image data S4.

An extension part 222 is provided for increasing the number of bits of image data S5 provided from delay memory 223 to be of the original number of bits (eight bits) or transferring it.

An address controlling part 224 is provided for generating addresses for writing and reading data into/from delay memory 223 and, on the occasion of reading, it updates an address for reading according to a print clock. The address for reading is reset to "0" by a reset signal RES from an address reset counter 225.

Address reset counter 225 is for resetting an address for reading generated from address controlling part 224. In address reset counter 225, a data value corresponding to the amount of difference between exposure positions is preset from a CPU (not shown), and address reset counter 225 provides a reset signal RES to address controlling part 224 every time the number of times of application of a horizontal synchronizing signal (a synchronizing signal in the direction of the main scanning) SOS becomes equal to the preset value.

A timing controlling part 226 controls the timing of reading and writing of delay memory 223.

A memory mounting amount detecting part 227 is for detecting the state of mounting in delay memory 223 and designating the number of bits to be delayed by delay memory 223 for compressing part 221 and extension part 222 in accordance with the detected state of mounting.

Figure 2:
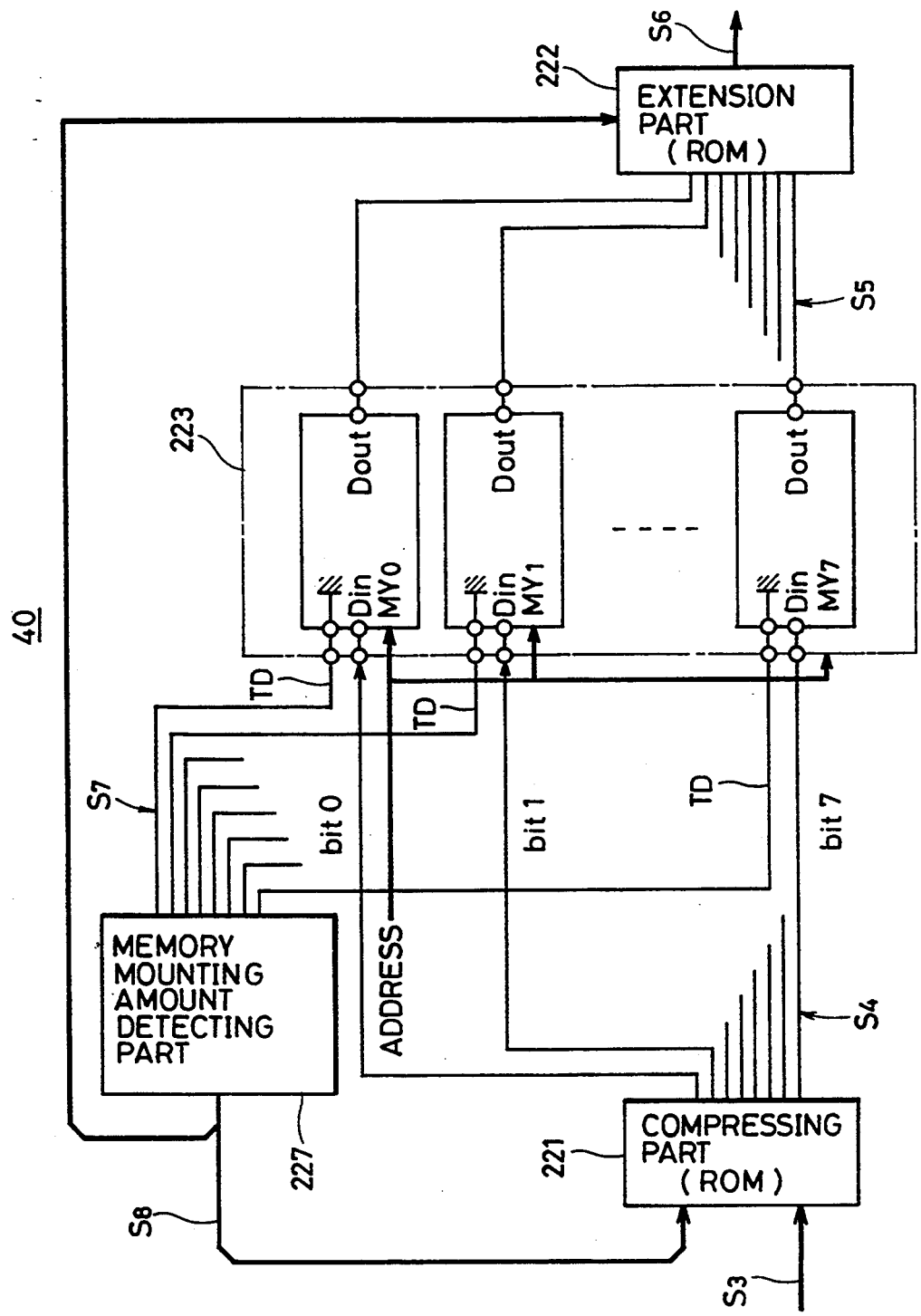
FIG. 2 is a block diagram illustrating an example of a circuitry configuration of a main part of the print processing part in FIG. 1.

FIG. 2 is a block diagram illustrating an example of a circuitry configuration of a main part of print processing part 40 in FIG. 1.

Referring to FIG. 2, a delay memory 223 includes a maximum of eight memory board units MY0-7 on which RAMs are mounted, respectively.

Memory board units MY0-7 are made to correspond to bits 0-7 of image data S4, S5, respectively, when they are mounted, inserted in connectors, respectively. In addition, they are made so that the potential of their respective mounting detection terminals TD fall to a ground potential to provide a mounting detection signal S7 when they are inserted in the connectors.

Memory mounting amount detecting part 227 receives mounting detection signal S7 of eight bits as an input and provides memory detection data S8 of three bits according to the content of the input, and uses 74LS148 (8 to 3 Line-Priority-Encoder) on the market or the like, for example.

Compressing part 221 is a ROM wherein an address is designated by image data S3 of eight bits and memory detection data S8 of three bits provided from memory mounting amount detecting part 227. Data obtained by converting the content of image data S3 into bits of a number corresponding to the content of memory detection data S8 is stored in the ROM.

For example, in a case where four memory board units MY0–3 are mounted, the least significant four bits of mounting detection signal S7 are brought to "L", and the most significant four bits of it are brought to "H", memory detection data S8 of "100B" (B expresses a binary number) is provided according to that, and memory detection data S8 is applied to compressing part 221, so that image data S4 of four bits corresponding to image data S3 is provided from compressing part 221.

Accordingly, image data S3 of 256 tones (eight bits) is converted into image data S4 of 16 tones (four bits). Then, the content of image data S4 of four bits can have relation of various functions such as a linear function, a quadratic function, a logarithmic function, an exponential function, or the like to the gradient of the original eight-bit image data S3.

Extension part 222 is a ROM in which an address is designated by image data S5 and memory detection data S8. Image data S6 of eight bits corresponding to the content of the least significant bits of a number designated by memory detection data S8 out of eight bits of image data S5 is stored in this ROM so that it performs an operation opposite to the operation of compressing part 221.

Accordingly, in the simultaneous bicolor mode, image data S3 provided from black buffer 213 becomes image data S4 in which the number of bits has been decreased by compressing part 221. Image data S4 is delayed by a predetermined time by delay memory 223, recovered to be image data S6 of eight bits by extension part 222, and luminance modulation of semiconductor laser 62 is performed by black laser controlling part 215 according to image data S6.

In addition, the number of memory board units (MY0–7) mounted in delay memory 223 is detected by memory mounting amount detecting part 227, and an operation of converting the number of bits is performed by compressing part 221 and extension part 222 so that the number of bits is made to correspond to the state of mounting in delay memory 223.

According to the above embodiment, it is possible to change the number of tones easily by increasing and decreasing the capacity of delay memory 223 by mounting and removing memory board units MY0–7.

Therefore, for example, it is possible to determine that the number of tones is 16 tones in the stage of designing copying machine 1 and increase the capacity of delay memory 223 as occasion demands according to subsequent version up or option so that the number of tones is increased to be 32 tones, 64 tones, and so forth to make copying machine 1 with high cost performance. In addition, it is also easy to change the number of tones suitably according to the color of an image formed by semiconductor laser 62 or the like.

Image data S4 except bits related mounted memory board units (MY0–7) is disregarded, so that it is possible to perform stable bit converting processing by compressing part 221 and extension part 222.

According to the above embodiment, the number of bits of image data S3, S4, S5, and S6 can be set variously, apart from the above-described numbers. It is possible to use a first-in first-out memory capable of reading and writing as delay memory 223. The whole structure of print processing part 40 or copying machine 1 or the structure of each part of print processing part 40 and copying machine 1 can be changed variously, apart from the above-described structures.

The present invention can be applied to a laser printer, a page printer, and other various equipment, apart from the above-described copying machine 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image data processing apparatus for processing image data having a plurality of bits which represent tones, comprising:
   compressing means for compressing image data by decreasing the number of bits of image data which represent tones;
   memory means for storing the image data compressed by said compressing means, said memory means having a variable storage capacity;
   detecting means for automatically detecting the storage capacity of said memory means; and
   setting means for controlling said compressing means by setting the rate of the decrease in the number of bits of the image data which represent tones in said compressing means on the basis of the storage capacity of said memory means detected by said detecting means.

2. The image data processing apparatus according to claim 1, further comprising: data extending means for extending the image data provided from said memory means by increasing the number of bits of image data to the original number of bits.

3. The image data processing apparatus according to claim 1, wherein a plurality of memories can be mounted in an attachable/detachable manner in said memory means, and said detecting means detects the storage capacity on the basis of the number of memories mounted in said memory means.

4. An image forming apparatus, comprising:
   an image holding member being capable of forming an image on a surface thereof and moving in a predetermined direction;
   a plurality of image writing means including first image writing means for writing an image on the surface of said image holding member in a first position according to first image data and second image writing means for writing an image on the surface of said image holding member in a second position according to second image data different from said first image data, said second position being a position at which said holding member arrives by moving a predetermined distance in said predetermined direction from said first position, said second image data having a plurality of bit data which represent tones;

an image data delaying apparatus for delaying said second image data for a time required for said image holding member to move the predetermined distance from said first position to said second position, said image data delaying apparatus including:

compressing means for compressing image data by decreasing the number of bits of image data which represent tones, memory means for storing the image data compressed by said compressing means for the time required for said image holding member to move said predetermined distance, said memory means having a variable storage capacity, detecting means for automatically detecting the storage capacity of said memory means; and setting means for controlling said compressing means by setting the rate of the decrease in the number of bits of the image data which represent tones in said compressing means on the basis of the storage capacity of said memory means detected by said detecting means.

5. The image forming apparatus according to claim 4, further comprising data extending means for extending the image data provided from said memory means by increasing the number of bits of the image data to the original number of bits.

6. The image forming apparatus according to claim 4, wherein a plurality of memories can be mounted in an attachable/detachable manner in said memory means, and said detecting means detects the storage capacity on the basis of the number of memories mounted in said memory means.

7. The image forming apparatus according to claim 4, wherein said memory means includes a plurality of boards on each of which memory is mounted and a mounting part in which said boards can be mounted, and said detecting means detects the storage capacity on the basis of the number of said boards mounted in said mounting part.

8. The image forming apparatus according to claim 7, wherein the memory mounted on one of said boards in said memory means has a storage capacity required for said image data delaying apparatus to delay image data of one bit.

9. The image forming apparatus according to claim 4, wherein said second image data is image data of black, and said first image data is image data of colors other than black.

* * * * *